(12) United States Patent
Callaway et al.

(10) Patent No.: US 8,430,982 B2
(45) Date of Patent: Apr. 30, 2013

(54) PYROPHORIC MATERIAL

(75) Inventors: James Dominic Callaway, Fort Halstead (GB); James Neil Towning, Fort Halstead (GB); Raymond Cook, Invercargill (NZ); Paul Smith, Birmingham (GB); David Graham McCartney, Nottingham (GB); Andrew J. Horlock, Lugano (CH)

(73) Assignee: The Secretary of State for Defence (GB)

( * ) Notice: Subject to any disclaimer, the term of this patent is extended or adjusted under 35 U.S.C. 154(b) by 112 days.

(21) Appl. No.: 12/988,010

(22) PCT Filed: Apr. 14, 2009

(86) PCT No.: PCT/GB2009/000955
§ 371 (c)(1),
(2), (4) Date: Mar. 31, 2011

(87) PCT Pub. No.: WO2009/127813
PCT Pub. Date: Oct. 22, 2009

(65) Prior Publication Data
US 2011/0174183 A1  Jul. 21, 2011

(30) Foreign Application Priority Data
Apr. 16, 2008 (GB) .................................. 0806855.3

(51) Int. Cl.
*C06B 45/00* (2006.01)
*D03D 23/00* (2006.01)

(52) U.S. Cl.
USPC .......................................... 149/23; 149/109.6

(58) Field of Classification Search ..................... 149/23, 149/109.6
See application file for complete search history.

(56) References Cited

U.S. PATENT DOCUMENTS

| 1,915,473 | A | | 6/1933 | Raney |
| 3,637,437 | A | * | 1/1972 | Goldberger .................... 429/527 |
| 3,990,996 | A | | 11/1976 | Gal et al. |
| 4,349,612 | A | * | 9/1982 | Baldi ............................ 428/607 |
| 4,957,421 | A | | 9/1990 | Baldi |
| 5,182,078 | A | | 1/1993 | Baldi |

FOREIGN PATENT DOCUMENTS

| GB | 1530850 | 11/1978 |
| WO | WO8910340 | 11/1989 |
| WO | WO9107242 | 5/1991 |

OTHER PUBLICATIONS

Search Report dated Jul. 28, 2008 in priority Application No. GB0806855.3.

* cited by examiner

*Primary Examiner* — Aileen B Felton
(74) *Attorney, Agent, or Firm* — Dean W. Russell; Kilpatrick Townsend & Stockton LLP

(57) ABSTRACT

A pyrophoric material comprises a pyrophoric metal coated onto a wire mesh substrate. Iron and nickel are the preferred metals and a steel wire mesh is suitable. A process for making the pyrophoric material involves spraying an alloy of iron and/or nickel with aluminium onto a mesh using a high velocity oxy-fuel (HVOF) process following by leaching out at least a proportion of the aluminium by treatment with an alkaline solution. The product has application as a supported catalyst or as either an ignition medium or as a flare material in military countermeasures in which applications it is capable of burning at a high temperature.

24 Claims, 3 Drawing Sheets

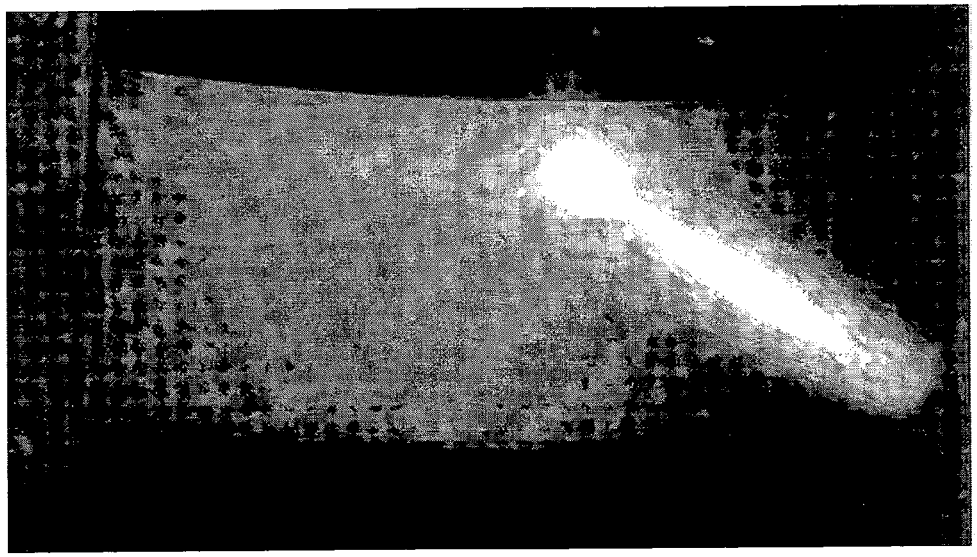
Figure 1
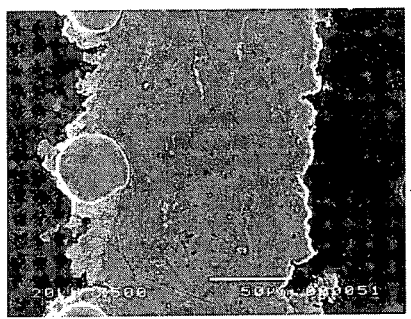 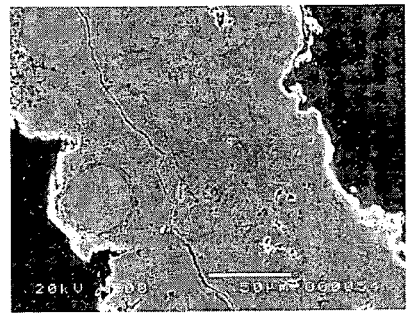
Figure 2A                                Figure 2B

PYROPHORIC MATERIAL

CROSS REFERENCE TO RELATED APPLICATIONS

This application is the U.S. national phase of International Application No. PCT/GB2009/000955 filed on Apr. 14, 2009 and published in English on Oct. 22, 2009 as International Publication No. WO 2009/127813 A1, which application claims priority to Great Britain Patent Application No. 0806855.3 filed on Apr. 16, 2008, the contents of both of which are incorporated herein by reference.

The present invention relates to a novel form of pyrophoric material having applications in military decoy flares and potentially as a catalyst for processes in the chemical and other industries.

Raney nickel catalysts have been known for many years (as described, for example, in U.S. Pat. No. 1,915,473). Conventionally such catalysts were prepared from Raney alloys containing catalytically-active nickel and a catalytically-inactive component such as aluminium or silicon. The Raney alloy, in particulate form, is treated with a solvent (usually an aqueous alkali) in order to leach out the catalytically-inactive component from the alloy, leaving behind the catalytically active metal in the form of a finely divided material. Raney nickel catalysts are used in this form to catalyse reactions where the reagents involved are either in solution or in gaseous form and are passed across a bed of the catalyst material or where the material is stirred with the reagent solution.

Surface-active materials also have found application in military decoy flares designed for the protection of aircraft against heat seeking missiles. Although heretofore the primary or only use of this type of decoy flare has been to protect military aircraft, interest has more recently been expressed by civilian airlines given the current world situation as regards terrorism and possible attacks against civilian targets including in-flight airliners.

One form of material which is in widespread use for decoy purposes is known as Activated Metal Decoy material (manufactured by Alloy Surfaces Inc. in the US). This material comprises a stack of very thin (75 micron) leaflets of iron, which are coated with pyrophoric iron. When these leaflets are ejected from the flare case into air they glow red-hot and then rapidly cool down as the pyrophoric material is consumed.

A known method of manufacturing pyrophoric metals such as iron or nickel (Raney nickel) involves crushing a nickel/aluminium or iron/aluminium alloy to a fine powder, which is then treated with caustic soda (NaOH) solution in order to remove the aluminium. This leaves a highly porous, un-oxidised iron or nickel powder of large surface area. The surfaces of these powders are extremely reactive and, when the particles are washed to remove the caustic soda and by-products and then dried, they will oxidise very rapidly in air attaining temperatures of around 1000° C. Raney nickel is a common reducing agent that is used widely in the chemical industry and particularly in the manufacture of margarine.

In the "natural" form described above the pyrophoric powder form of iron or nickel will be oxidised in air very rapidly. However, for use as an IR countermeasure, a more prolonged reaction time with a corresponding longer IR emission time is required. In the AMD material mentioned, this is achieved by having the pyrophoric nickel or iron material sintered onto a metal shim, which acts as an inert and heat sink substrate and slows down the pyrophoric reaction. The AMD material is made in the following manner:

i) A mix of aluminium and nickel or iron or cobalt particles is applied to a metal substrate in the form of 25 micron shim carried in a polyethylacrylate paste solution;
ii) The substrate is then exposed to a temperature of around 600-850° C. for a period of upto 3 minutes. This alloys the metal powder mixtures (Al/Fe, Al/Ni, Al/Co) and sinters them to the substrate;
iii) The material is subjected to leaching for several minutes in a dilute caustic soda solution;
iv) The product of iii) is washed and finally dried under an inert atmosphere.

Although the AMD material has been widely used as a military aircraft countermeasure it suffers from the disadvantage that the sintering process during manufacture limits the types of substrate that can be used and the alloy formulations that are possible. Decoy mass, temperature, dissemination and descent characteristics are also limited due to the process, substrates and materials formed.

The use of a screen or gauze material as the substrate for a catalytically active or pyrophoric material is known, as, for example, from U.S. Pat. Nos. 4,349,612 and 4,957,421. Typically an iron or nickel aluminide is deposited on the screen or gauze substrate by painting or spraying it on in the form of a slurry or by dipping the substrate into a slurry of the aluminide. U.S. Pat. No. 4,957,421 and International Publication WO89/10340 disclose the use of the Schoop spray process for coating substrates with either a catalytically active or a pyrophoric material. However none of these methods produce a particularly resilient or well attached coating on the substrate and a step of heating the coated product is generally required in order to provide improved adhesion of the active material to the substrate. The Schoop method, moreover, because it sprays the coating material in liquid form, does not allow control of the particle size of the material that is being sprayed and also by its nature allows a degree of oxidation of the coating material to occur which decreases the reactivity of the coated product. It further requires that the feedstock should be in the form of a wire or rod.

It is an object of the present invention to provide an alternative route to both air sensitive materials that can be used as a countermeasure material and materials for catalysing chemical processes which will obviate these difficulties and provide satisfactory and highly adaptable characteristics in the products for these applications.

Accordingly the present invention provides, in one aspect, a process for the production of a pyrophoric metal material which comprises the steps of:
a) preparing, in particulate form, an alloy of aluminium with one or more metals which are capable of demonstrating pyrophoric behaviour after treatment;
b) coating the formulated alloy onto a mesh substrate by a process of high velocity oxy-fuel plating;
c) leaching the product of step (b) with a caustic soda solution or other base (alkaline) solution to at least partially remove the aluminium from the deposited alloy; and
d) washing the product of step (c) under aqueous conditions and then under solvent conditions.

Optionally, the process comprises the further step (e) of heating the product of step (d) in either an inert gas environment or in a vacuum in order to remove the solvent used in step (d) and thus provide a "clean" product free of water, alkali and organic solvent.

The pyrophoric metal is preferably iron, nickel, cobalt or any mixed formulation of these prepared prior to deposition on the mesh. Alloys of iron with nickel are particularly preferred for use as the pyrophoric metal.

The mesh is preferably a steel mesh and preferably has an aperture size of between 30 microns and 80 microns, most preferably around 50 microns. The mesh wire preferably has a diameter of between 25 microns and 50 microns, most preferably of the order of 30 to 40 microns and particularly about 35 microns.

By appropriate selection of the amount or thickness of the coating material and of the mesh size of the substrate as well as the composition of the pyrophoric metal coating itself, it will be understood that it is possible to control to a fine degree the characteristics of the pyrophoric material of the present invention. Yet more precise control of the properties of the pyrophoric coating, particularly in respect of the porosity thereof, may be achieved through the process by which the pyrophoric metal coating is laid down and in general the present invention allows the physical properties of the pyrophoric material to be tailored to precisely meet the performance characteristics that are required dependent on the intended specific application envisaged for the material. In these respects the process according to the invention is remarkably advantageous as compared to the Schoop process by virtue of the high level of adhesion of the coating that is achieved and the high degree of controllability of the coating material that is possible.

Likewise where the end product is to be used as a catalytst, appropriate selection of the starting material and of the properties of the surface produced by the method of the invention in the manner already described allows the product to be most effectively tailored to the particular application.

In a further aspect the invention provides a process for the production of a catalytically active material comprising steps (a) to (d) as above described but in which the leaching of the aluminium in step (c) is not carried out to completion thus rendering the material either non- or only weakly pyrophoric but still catalytically active. For this use it is preferred to only remove about 30 to 60% of the aluminium in the alloy deposited on the substrate leaving upto 20% by weight of aluminium in the catalytic surface. Alternatively, the Fe/Ni/Al alloy can be formed with at least about 10% by weight of chromium, preferably at least 15% by weight, to provide a very effective catalyst surface. Conversely, for good pyrophoricity it is important to ensure that the starting alloy material is free of chromium or contains only minor traces thereof.

Alternatively, for use as a catalyst, the product of the process of the invention may be further treated so as to prevent ignition of the material surface on exposure to air and to enhance its catalytic activity. Said process may therefore further comprise a step in which a coating that is capable of enhancing the catalytic activity of the material surface is applied thereto. For example, a film of platinum or palladium metal or a thin layer of zirconium oxide powder may be deposited on the material surface. Other methods of enhancing the catalytic activity will be readily apparent to those skilled in the art.

Preferably the process of the invention involves the use of an alloy of either or both of the metals iron and nickel in combination with aluminium. Such alloys preferably comprise from 40 to 60% by weight of Al with the balance comprising either Fe or Ni or a mixture thereof. Preferred alloys comprise a composition of from 20 to 30% by weight of iron with 20 to 30% by weight nickel and from 40 to 60% by weight of aluminium or compositions comprising 40% by weight of either Fe or Ni, 10% by weight of Ni or Fe respectively and 50% by weight of Al. Other alloy compositions that may be used in the process of this invention include a proportion of Co as well as Fe and/or Ni but the use of Co is less preferred on account of its lower heat output on combustion.

The high velocity oxy-fuel or HVOF process uses a high-pressure gas stream to eject particles at supersonic velocities. Typically the gas stream is generated by burning a mixture of hydrogen and oxygen with a fuel such as propylene in a chamber. The material which is to be deposited on the substrate is introduced in particulate form into the gas stream exiting the chamber and the stream carrying the material to be deposited is directed onto the substrate. The temperature of and speed at which the particles are collided with the substrate results in a good adhesion of the particles to the substrate, typically some 4 to 5 times better than with conventional flame spraying techniques. The process is widely used to produce corrosion and wear resistant coatings such as titanium carbide for many different applications.

The HVOF method depends on the particulate feedstock material having good flow properties and in general this means that the particulate material must be of fine grade with a particle size of typically 10 microns to 70 microns and preferably made by a crushing/grinding process. Particles below 10 micron in size can have too high a proportion of surface oxide and cause problems with flow in the HVOF powder feed system. On the other hand particles above 70 micron in size can cause nozzle blocking problems with the HVOF spray and also their higher mass can lead to sedimentation within the gas flow.

The alloy composition for use in the process of the present invention should therefore be provided in particulate form having an appropriate particle size relative to the HVOF equipment that is to be used in the process.

In order to build up a desired thickness of the particulate material on the substrate the HVOF gas stream may be passed repeatedly over the area of the substrate on which it is desired to deposit the particulate metal alloy. It will be appreciated that this allows a high level of control to be exercised as to the thickness of the material which is deposited on a given sample of substrate. It will also be appreciated that material can be deposited on either one or on both sides of a substrate.

Following the application of the particulate alloy to the mesh substrate in the manner described above, the product is treated with a solution of caustic soda or other alkaline solution typically having a strength of from 10% to 50% by weight of alkali, followed by washing to remove reagent and unwanted by products and finally, drying in an inert atmosphere. Washing preferably involves a first stage using dilute (<0.5%) sodium hydroxide or de-mineralized/de-gassed water and a second stage using drying solvent typically acetone or ethanol or methanol. Conveniently, argon is used as the inert atmosphere and drying is carried out at a temperature of about 100° C. Where the product is to be used as a catalyst rather than a pyrophoric material, however, the leaching process is preferably not allowed to proceed to completion, leaving a proportion of the aluminium content in the final product. In this case, if the pyrophoric character of the end product is sufficiently minimised it will not be necessary to use an inert atmosphere in handling the leached (catalytically activated) product.

The mesh substrate is preferably a stainless steel mesh having an aperture size in the range of from 30 microns to 80 microns. It is advantageous to clean and degrease the mesh prior to HVOF treatment using an organic solvent such as acetone or other known suitable alternative.

It will be appreciated that by appropriate selection of the amount or thickness of the deposited material and of the mesh size of the substrate as well as the composition of the deposited metal alloy, then, bearing in mind that at least a proportion of the aluminium component of the alloy will be removed in the leaching process, it is possible to control to a fine degree the characteristics of the pyrophoric material that results from the present process. In particular it is possible to produce a material which has a very high degree of porosity and in general the physical properties of the pyrophoric material can be tailored to meet precisely the performance characteristics that are required dependent on the intended specific application envisaged for the material.

For example, where the alloy coating is deposited at a thickness such that the leaching process results in the openings in the mesh becoming exposed, the surface area of the coating material will then be very high. This will result in a material which will oxidise when exposed to oxygen in air at a high rate and achieve a high temperature of combustion of between 550 C to 1100 C. Where, on the other hand, the coating of pyrophoric material is relatively thin, removal of material during the leaching process may damage or even destroy the integrity of the deposit. On the other hand again, where a thick coating is applied such that the pores of the mesh are not opened up on leaching of the deposit, the resulting product will have a smaller surface area and will act as a partial heat sink and will oxidise at a lower rate and at a lower temperature, albeit over a longer period.

Conveniently, in the process according to the invention a deposit of the formulated metal alloy material having a thickness of from 30 microns to 60 microns is typically achieved. To obtain such a thickness may require a number of passes of the HVOF gas stream to be made, typically of the order of from 10 to 40 passes. For application as a pyrophoric material in a decoy flare, it is convenient to provide a material where a mesh substrate as described is coated from one side with an alloy thickness of from 30 to 60 microns. This will provide a product having a high degree of porosity and which is usefully also of relatively low density.

For application in a decoy flare the pyrophoric metal material produced by the process of the invention can be packaged as a expendable device. The material can be cut into suitable sized pieces, for instance 20 mm squares ("leaflets") prior to activation and these can then be packaged into a flare container. The stack of leaflets is supported prior to loading by 2 interconnecting plastic sabots, and the stack is then loaded under inert conditions into an empty flare cartridge with a 3-ribbed rubber seal at the top and the bottom of the container to provide an airtight seal. This assembly fits inside the usual flare fittings of the base ejection shutter and the top lid. Grease, for instance based on molybdenum disulphide, can be used to assist with the insertion, sealing, and final ejection of the payload.

The pyrophoric product of the invention is also suitable for use as an ignition medium. It can, for example, be coated with a layer of a readily ignited material such as magnesium, lithium, boron, titanium, aluminium or the like in order to provide an intense heat source. Other methods of application of the pyrophoric materials obtainable by the method of this invention as ignition means will be readily apparent to those skilled in the art.

It will be appreciated also from the above discussion that the method of the present invention is advantageous in obviating or at least minimising a problem which arises with the conventional method of production of Raney nickel catalysts. This is that the conventional method tends to produce materials which do not have consistent and reproducible characteristics, e.g. maximum and minimum particle sizes, size distribution, inactive metal content etc. As a consequence the catalytic activity of conventionally manufactured nickel catalysts varies considerably from batch to batch. Various approaches have been tried to overcome this particular problem, for example as shown in U.S. Pat. No. 3,990,996 where the leaching process is carried out in a medium kept in a constant turbulent flow so as to remove particles below a preset minimum size. Such problems are largely overcome by the method of the present invention.

An additional advantage of the activated materials produced by the process of the present invention is that the use of loose, powdered catalyst materials with potential contamination of the reaction products is thereby avoided. Although techniques of producing conventional Raney catalyst material which is supported on a substrate have been developed (see e.g. U.S. Pat. No. 3,637,437), it will be appreciated that, per given mass of catalytic material, the catalyst in supported form will be less active than the non-supported material because of the proportionately lower surface (active) area of the catalyst material which is exposed to the reaction medium in the former.

It will be appreciated that the present invention can provide highly porous nickel catalyst material of consistent high activity but which is fixed to a substrate and thus will not lead to contamination of reaction products generated using the catalyst. Conveniently, for this application, a relatively thin coating of alloy will be applied to the mesh substrate such that, after leaching, a highly porous coating results with very large surface area of catalyst material and thus high activity.

The nickel aluminium alloy can be any of those of the type which are conventionally used in the manufacture of Raney nickel catalysts, for example nickel or iron or cobalt or any formulated alloy mixture. The alloy should be in the form of a powder having a particle size in the range of from 10 to 70 microns, preferably from 10 to 60 microns. Material of this size is suitable for spraying in a high velocity thermal spray gun.

The invention will now be further illustrated by reference to the accompanying drawings and photographs in which:

FIG. 1 shows a high velocity oxy-flame deposition process in progress;

FIG. 2 shows two SEM photographs in cross section of two coated mesh materials of different composition;

Referring now to FIG. 1 the incidence of some wrinkles on the surface of the mesh substrate can be observed. This is due to heat stress of the flame on the mesh.

Referring to FIG. 2 the mesh wire can be seen in cross section on the left hand side of each of the images. FIG. 2A shows a deposited alloy comprised of 40% Fe and 60% Al by weight and FIG. 2B shows a deposited alloy comprised of 60% Ni and 40% Al by weight.

Figure 3:
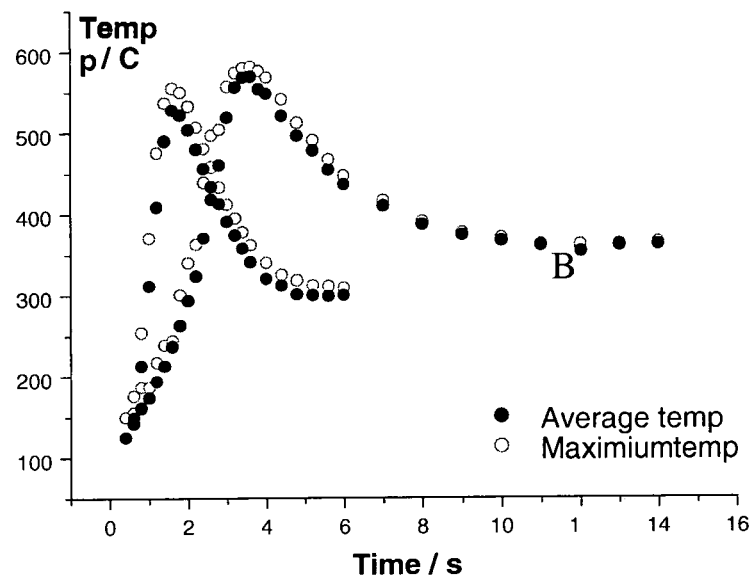
FIGS. 3 and 4 show temperature-time plots obtained from a thermal imager for the reaction in air of two coated mesh materials respectively containing Fe and Ni as the pyrophoric metal.
Figure 4:
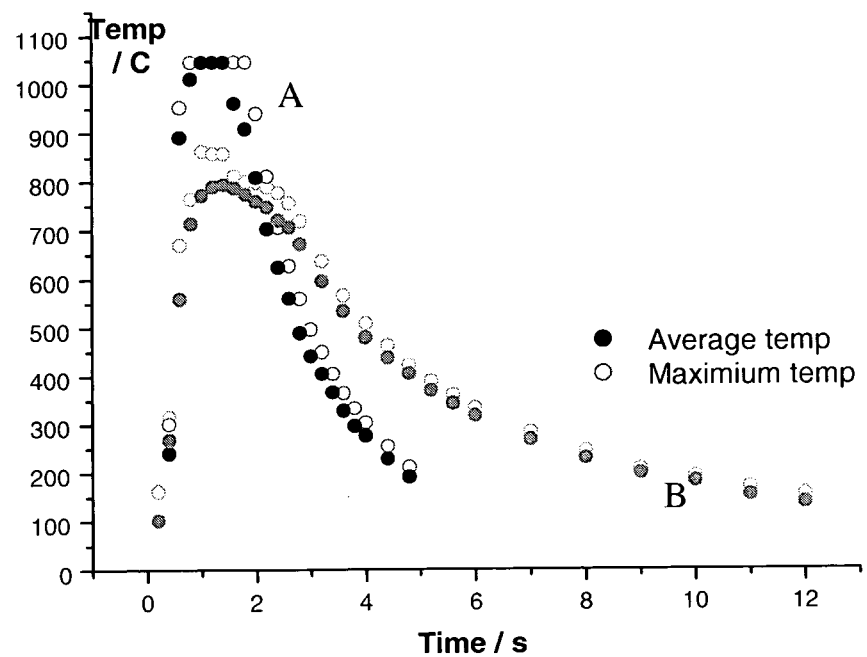

The graphs in FIGS. 3 and 4 show that the materials oxidise more quickly and attain a higher peak temperature in a moving air stream (from a desk fan) (line "A") than in still air (line "B"). It is also clear that the combustion of the activated Ni-coated mesh material produces substantially higher temperatures than can be attained with an equivalent Fe-coated material.

Figure 5:
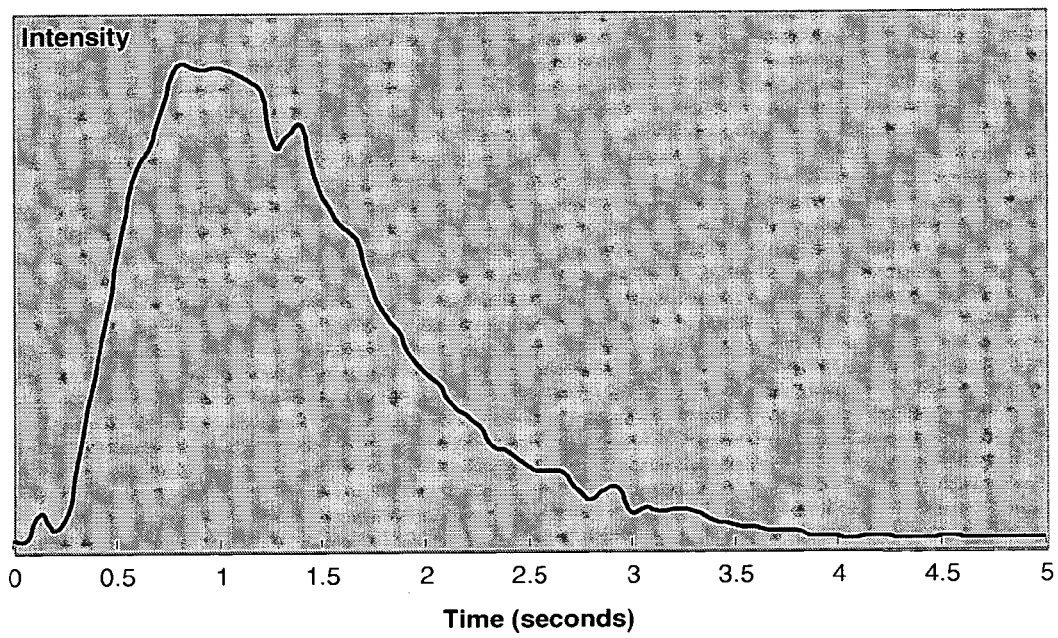
FIG. 5 is a graph of infrared intensity against time obtained with a number of leaflets comprised of a material according to the present invention ejected from the ground.

The graph in FIG. 5 demonstrates that leaflets comprised of a material according to the present invention ignite almost immediately on exposure to the air and quickly reach a peak intensity of infra-red emission, followed by a slower fading as the material is progressively consumed in the combustion process.

The invention is now further illustrated by reference to the following example thereof.

EXAMPLE

An alloy of nickel, iron and aluminium was prepared in the ratio of 20% Fe, 30% Ni, and 50% by weight. This was produced by adding the appropriate amounts of iron and nickel to an aluminium melt. The alloy was cast into a form suitable for subsequent crushing and grinding to obtain a powder of particle size less than 63 microns. Fine particles of a size less than 10 micron were removed by gas classification.

A sample of stainless steel mesh (SS304), approximately 0.9 m², was coated with the powder using the HVOF technique. The mesh had a wire diameter of 36 microns with an aperture of 53 microns. The coating was built up using (typically) fourteen passes of the HVOF gun resulting in a loading of between 270 and 330 g m$^{-2}$ over the surface of the mesh. The coating thickness was approximately 47 microns.

The coated mesh was cut into samples approximately 20 mm square, and activated by submersing in 20% NaOH solution for at least 1 hr. The samples were then rinsed firstly in deoxygenated, de-ionised water, secondly in acetone, and finally in diethyl ether. A sample was then transferred to a container of argon and subjected to an argon flush to dry off the ether.

When exposed to air the sample attained a temperature of over 700° C.

The invention claimed is:

1. A process for the production of an activated metal material which comprises the steps of:
   a) preparing, in particulate form, an alloy of aluminum with one or more metals which are capable of demonstrating pyrophoric behaviour after treatment;
   b) coating the formulated alloy onto a metallic mesh substrate by a process of high velocity oxy-fuel plating;
   c) leaching the product of step (b) with a base (alkaline) solution to at least partially remove the aluminum from the deposited alloy; and
   d) washing the product of step (c) under aqueous conditions and then under solvent conditions to remove reagent and water.

2. A process according to claim 1 wherein the metal in step (a) is iron, nickel or cobalt or a mixture thereof.

3. A process according to claim 2 wherein the metal is an alloy of iron and nickel.

4. A process according to claim 3 wherein the alloy of iron and nickel comprises between 4 and 0.25 parts of iron to 1 part of nickel by weight.

5. A process according to claim 1 wherein the metal particles have a size of from 10 to 70 microns.

6. A process according to claim 1 wherein the alloy for step (a) comprises from 40 to 60% by weight of aluminum.

7. A process according to claim 2 Wherein the balance of the alloy comprises from 20 to 30% by weight each of iron and nickel.

8. A process according to claim 7 wherein the alloy comprises 50% by weight of aluminum, 40% by weight of either nickel or iron and 10% by weight of either iron or nickel respectively.

9. A process according to claim 1 wherein the metallic mesh substrate comprises stainless steel.

10. A process according to claim 1 wherein the metallic mesh substrate has an aperture size of between 30 and 80 microns and a mesh wire diameter of between 25 and 50 microns.

11. A process according to claim 10 wherein the metallic mesh has an aperture size of about 50 microns.

12. A process according to claim 10 wherein the metallic mesh has a wire diameter of about 35 microns.

13. A process according to claim 1 wherein, in step (b) the coating has a thickness of from 30 to 70 microns.

14. A process according to claim 1 wherein the base in step (c) is sodium hydroxide.

15. A process according to claim 1 wherein the solvent in step (d) is acetone, ethanol, methanol or diethyl ether.

16. A process according to claim 1 comprising the further step (e) of heating the product of step (d) in either an inert gas environment or in a vacuum in order to remove the solvent used in step (d).

17. A process according to claim 1 wherein a proportion of the aluminum content of the formulated alloy is allowed to remain in the product.

18. A process according to claim 17 wherein the product contains up to 20% by weight of aluminum.

19. A process according to claim 1 wherein a coating of platinum, palladium or zirconium oxide is applied to the surface of the product of step (d).

20. A process according to claim 1 wherein the activated metal material is a pyrophoric material.

21. A process according to claim wherein the activated metal material has catalytic activity.

22. A process according to claim 1 in which the product of step(d) is a pyrophoric metal material, further comprising using jhe pyrophoric metal material as part of an expendable decoy flare.

23. A process according to claim 1 further comprising using the product of step (d) as a catalyst.

24. A process according to claim 1 further comprising using the product of step (d) as an ignition medium.

* * * * *

UNITED STATES PATENT AND TRADEMARK OFFICE
CERTIFICATE OF CORRECTION

PATENT NO. : 8,430,982 B2
APPLICATION NO. : 12/988010
DATED : April 30, 2013
INVENTOR(S) : James Dominic Callaway et al.

It is certified that error appears in the above-identified patent and that said Letters Patent is hereby corrected as shown below:

In the Claims:

Column 8, Claim 21, Line 1
Insert --1-- following the word "claim"

Column 8, Claim 22, Line 3
Delete "jhe" and insert --the-- in place thereof

Signed and Sealed this
Ninth Day of July, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,430,982 B2
APPLICATION NO. : 12/988010
DATED : April 30, 2013
INVENTOR(S) : James Dominic Callaway et al.

It is certified that error appears in the above-identified patent and that said Letters Patent is hereby corrected as shown below:

In the Claims:

Column 8, line 41 (Claim 21, Line 1)
Insert --1-- following the word "claim"

Column 8, line 45 (Claim 22, Line 3)
Delete "jhe" and insert --the-- in place thereof This certificate supersedes the Certificate of Correction issued July 9, 2013.

Signed and Sealed this
Thirteenth Day of August, 2013

Teresa Stanek Rea
*Acting Director of the United States Patent and Trademark Office*